US008639884B2

(12) United States Patent
Tran (10) Patent No.: US 8,639,884 B2
(45) Date of Patent: Jan. 28, 2014

(54) SYSTEMS AND METHODS FOR CONFIGURING LOAD/STORE EXECUTION UNITS

(75) Inventor: Thang M. Tran, Austin, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 328 days.

(21) Appl. No.: 13/037,013

(22) Filed: Feb. 28, 2011

(65) Prior Publication Data

US 2012/0221796 A1    Aug. 30, 2012

(51) Int. Cl.
G06F 12/08 (2006.01)
G06F 9/30 (2006.01)
G06F 9/38 (2006.01)

(52) U.S. Cl.
CPC ........ *G06F 12/0842* (2013.01); *G06F 12/0848* (2013.01); *G06F 9/30043* (2013.01); *G06F 9/3851* (2013.01)
USPC ............ 711/131; 711/E12.039; 711/E12.046; 712/225; 712/E9.053

(58) Field of Classification Search
CPC ........................ G06F 12/0842; G06F 12/0853
See application file for complete search history.

(56) References Cited

U.S. PATENT DOCUMENTS 5,502,683 A * 3/1996 Marchioro ............... 365/230.05
6,272,616 B1 * 8/2001 Fernando et al. ............... 712/20
6,304,954 B1 * 10/2001 Munson ........................ 712/215
6,341,347 B1 * 1/2002 Joy et al. ........................ 712/228
7,257,814 B1 * 8/2007 Melvin et al. .................. 718/104
7,353,364 B1 * 4/2008 Chong et al. .................. 712/215
2003/0191927 A1 * 10/2003 Joy et al. ........................ 712/228
2006/0184741 A1 * 8/2006 Hrusecky et al. ............. 711/130
2006/0265576 A1 * 11/2006 Davis et al. ................... 712/229
2007/0143581 A1 * 6/2007 Mansell ........................ 712/225
2007/0204137 A1    8/2007 Tran
2008/0091880 A1 * 4/2008 Vishin .......................... 711/122
2008/0229058 A1 * 9/2008 Le et al. .......................... 712/13
2012/0246448 A1 * 9/2012 Abdallah ...................... 712/214
2013/0212585 A1 * 8/2013 Tran ............................. 718/102

OTHER PUBLICATIONS

Jude A. Rivers et al. "On High-Bandwidth Data Cache Design for Multi-Issue Processors." Dec. 1997. IEEE. MICRO '97. pp. 46-56.*

(Continued)

*Primary Examiner* — Nathan Sadler
(74) *Attorney, Agent, or Firm* — Mary Jo Bertani (57) ABSTRACT

Systems and methods are disclosed for multi-threading computer systems. In a computer system executing multiple program threads in a processing unit, a first load/store execution unit is configured to handle instructions from a first program thread and a second load/store execution unit is configured to handle instructions from a second program thread. When the computer system executing a single program thread, the first and second load/store execution units are reconfigured to handle instructions from the single program thread, and a Level 1 (L1) data cache is reconfigured with a first port to communicate with the first load/store execution unit and a second port to communicate with the second load/store execution unit.

16 Claims, 6 Drawing Sheets

(56) References Cited

OTHER PUBLICATIONS

Kenneth M. Wilson and Kunle Olukotun. "Designing High Bandwidth On-Chip Caches." Jun. 1997. ACM. ISCA '97. pp. 121-132.*

Bruce Shriver and Bennett Smith. The Anatomy of a High-Performance Microprocessor: A Systems Perspective. 1998. IEEE. pp. 77-83.*

Muhamed F. Mudawar. "Scalable Cache Memory Design for Large-Scale SMT Architectures." Jun. 2004. ACM. WMPI '04. pp. 65-71.*

Rakesh Kumar et al. "Conjoined-core Chip Multiprocessing." Dec. 2004. IEEE. MICRO-37 2004.*

Frank P. O'Connell and Steven W. White. "POWER3: The next generation of PowerPC processors." Nov. 2000. IBM. IBM Journal of Research and Development. vol. 44. pp. 873-884.

U.S. Appl. No. 13/036,321, Tang M. Tran, Office Action—Rejection, mailed Jul. 30, 2013.

* cited by examiner

SYSTEMS AND METHODS FOR CONFIGURING LOAD/STORE EXECUTION UNITS

BACKGROUND

1. Field

This disclosure relates generally to microprocessor architecture, and more specifically, to load/store execution unit configurations for a microprocessor operating in single and multi-thread modes.

2. Related Art

Various processor designers have attempted to increase on-chip parallelism through superscalar techniques, which are directed to increasing instruction level parallelism (ILP), and multi-threading techniques, which are directed to exploiting thread level parallelism (TLP). A superscalar architecture attempts to simultaneously execute more than one instruction by fetching multiple instructions and simultaneously dispatching them to multiple (sometimes identical) functional units of the processor. Superscalar processors differ from multi-core processors in that the functional units in the superscalar processor are not usually entire processors. A typical multi-threading operating system (OS) allows multiple processes and threads of the processes to utilize a processor one at a time, usually providing exclusive ownership of the processor to a particular thread for a time slice. In many cases, a process executing on a processor may stall for a number of cycles while waiting for some external resource (for example, a load from a random access memory (RAM)), thus lowering efficiency of the processor. Simultaneous multi-threading (SMT) allows multiple threads to execute different instructions in the same clock cycle, using functional units that another executing thread or threads left unused.

In multi-threading processors, it is desirable to improve the number of instructions per cycle not only when executing multiple threads, but also when executing a single thread.

BRIEF DESCRIPTION OF THE DRAWINGS

Embodiments of the present disclosure are illustrated by way of example and are not limited by the accompanying figures, in which like references indicate similar elements. Elements in the figures are illustrated for simplicity and clarity and have not necessarily been drawn to scale.

DETAILED DESCRIPTION

Embodiments of systems and methods disclosed herein are capable of operating in single and multi-threaded modes. In multi-thread mode, two independent load/store execution units are used to help enable the threads to be executed at least as fast as they would execute on separate processors. In single-thread mode, the second load/store execution unit is reconfigured for the thread along with instructions being executed in the first load/store execution unit. The increased instructions per cycle boost the performance of the processor in single-thread mode compared to configurations that only use one load/store execution unit during single-thread mode even though multiple load/store execution units are available for multi-thread mode.

Figure 1:
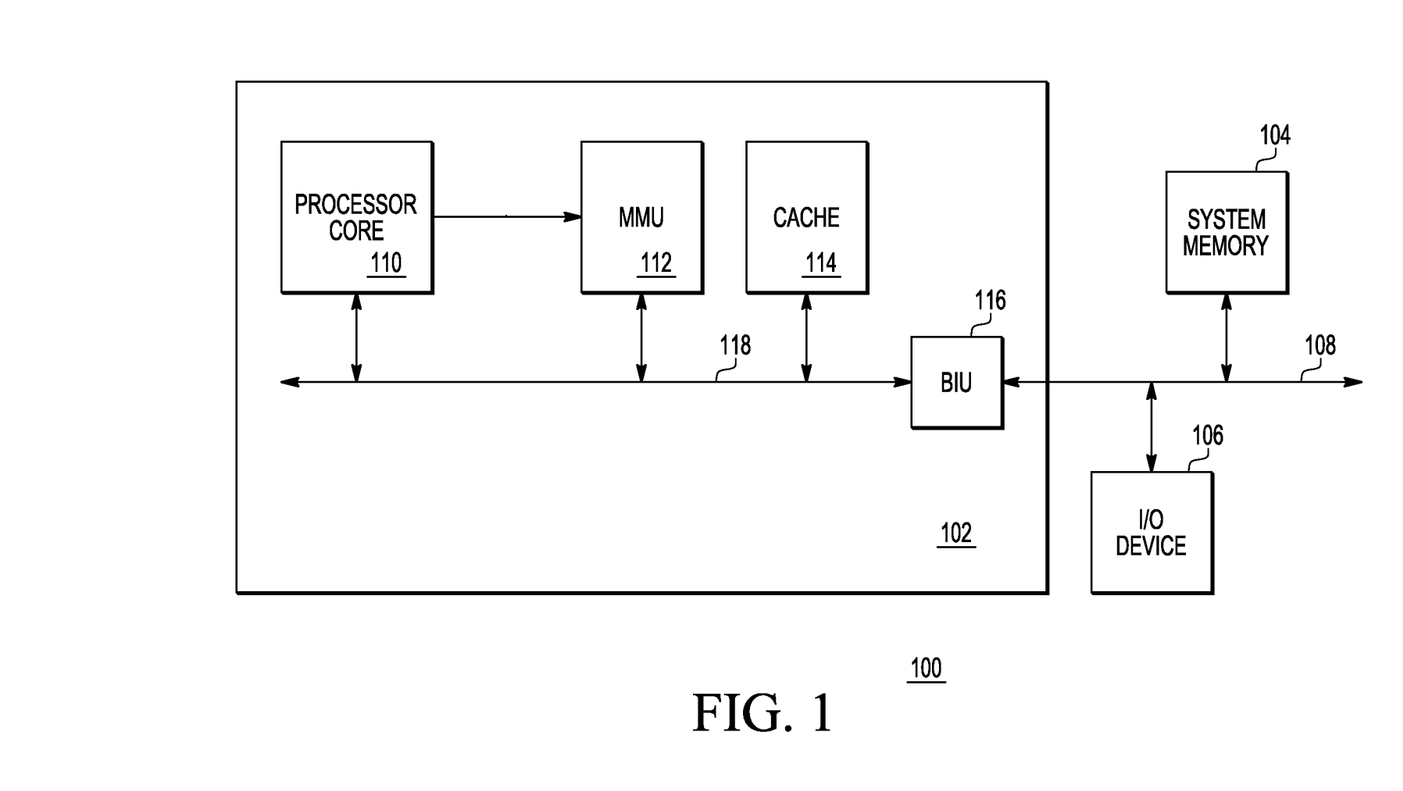
FIG. 1 is a diagram of an embodiment of a computer processing system in accordance with the present disclosure.

FIG. 1 illustrates a data processing system 100 that can be configured to utilize multiple load/store execution units with each load/store execution unit executing one or more threads during multi-thread mode, and to reconfigure one of the load/store execution units to allow a single thread to use multiple load/store execution units during single-thread processing mode in accordance with some embodiments of the present disclosure. In the depicted example, data processing system 100 includes processing device 102, system memory device 104 (e.g., random access memory (RAM)), and one or more input/output devices 106 connected via bus 108. Processing device 102 includes processor core 110, memory management unit (MMU) 112, cache memory 114, and bus interface unit (BIU) 116 interconnected via bus 118, whereby BIU 116 serves as an interface between bus 118 and bus 108.

In operation, processing device 102 executes instructions using processor core 110, whereby instruction data and operand data can be accessed from cache 114, system memory device 104, I/O device 106, or another source. Data resulting from the execution of the instructions can be provided for storage in system memory device 104 or provided to I/O device 106 via BIU 116. In order to expedite memory accesses to devices external to processing device 102 (e.g., system memory device 104 and I/O device 106), cache 114 can be used to cache instruction data and related data.

MMU 112 controls accesses to cache 114 and memory accesses to devices external to processing device 102, including system memory device 104 and I/O device 106. MMU 112 can map the system memory device 104 and the bus interface of the I/O device 106 to corresponding memory addresses (e.g., virtual memory addresses) so that all accesses to the external devices are treated as a memory access.

Figure 2A:
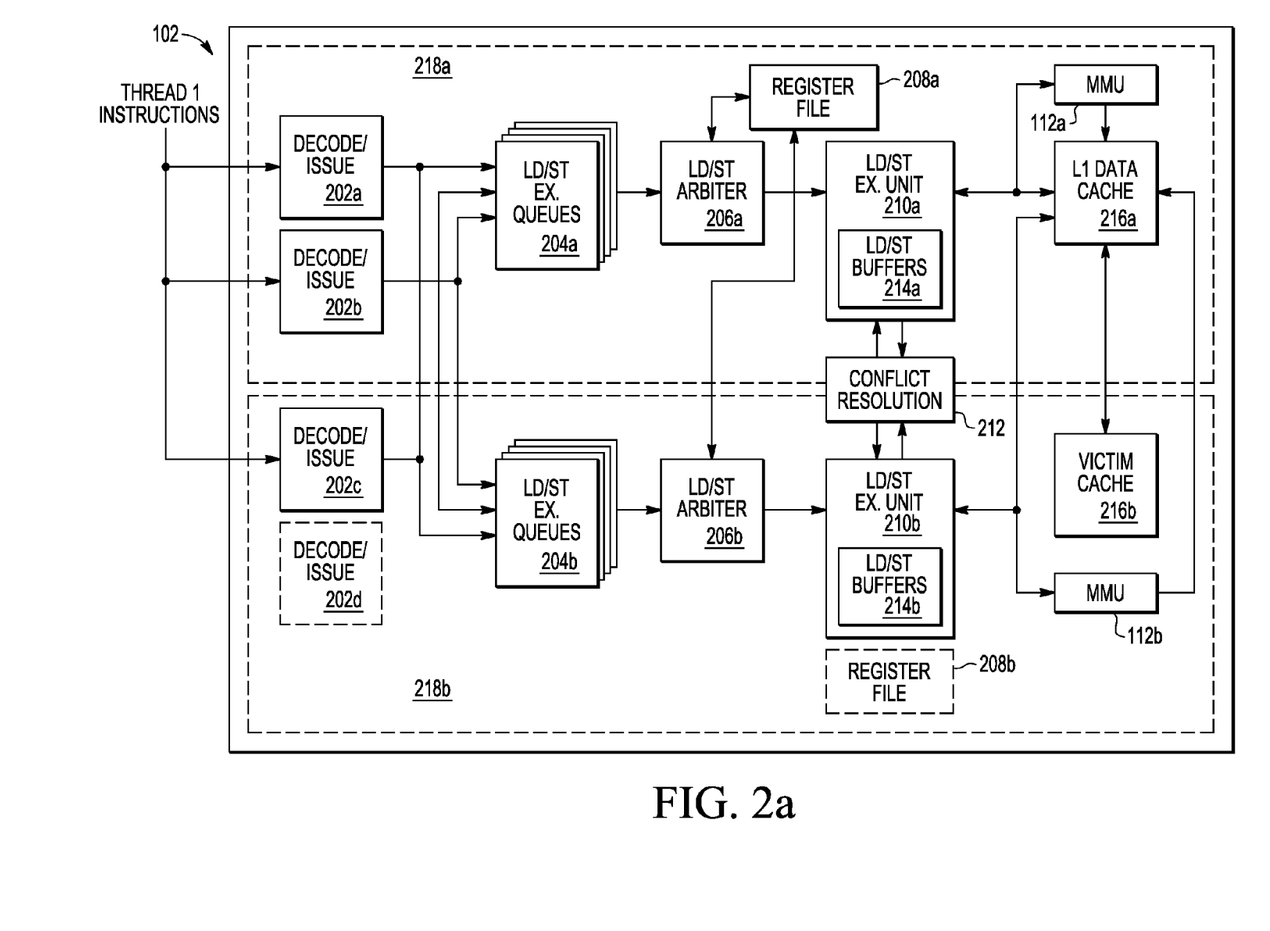
FIG. 2A is a diagram of an embodiment of components that are utilized in the computer processor of FIG. 1 running in single thread mode.

FIG. 2A is a diagram of an embodiment of components that can be used in computer processor 102 of FIG. 1 configured to run in single thread mode include decode/issue units 202a, 202b, 202c, load queues 204a, 204b, load arbiters 206a, 206b, register files 208a, 208b, load/store execution units 210a, 210b, conflict resolution module 212, load/store buffers 214a, 214b, MMUs 112a, 112b, and Level 1 cache units 216a, 216b with cache unit 216b serving as a victim cache for cache unit 216a. Decode/issue unit 202d and register file 208b are shown in dashed lines to indicate they are generally not required or used during single thread mode, but are used during multi-thread mode, as well as being available during single thread mode, if required. The description of FIG. 2A assumes processor 102 is configured to operate in single thread mode unless otherwise noted. Elements referred to herein with a particular reference number followed by a letter are collectively referred to by the reference number alone. For example, decode units 202a-202d are collectively referred to as decode units 202.

Processor 102 includes two execution pipeline 218a, 218b. Pipeline 218a includes decode/issue units 202a, 202b, load queues 204a, load arbiter 206a, register file 208a, load/store execution unit 210a, load/store buffers 214a, MMU 112a, and Level 1 cache unit 216a. Pipeline 218a includes decode/issue units 202c, 202d, load queues 204b, load arbiter 206b, register file 208b, load/store execution unit 210b, load/store buffers 214b, MMU 112b, and cache unit 216b serving as a victim cache for cache unit 216a in single thread mode. Conflict resolution module 212 connects to load/store units 210 to inhibit one L1 data cache access in case of an address conflict between load/store units 210. An address conflict arises when both load/store units 210 try to access the same physical module in L1 data cache 216a using a part of the address during the same clock cycle.

In single thread configuration, register file 208a communicates with load arbiters 206a, 206b, and load/store execution units 210 communicate directly with L1 data cache 216a. Conflict resolution module 212 determines whether instructions in load/store execution unit 210b have an address conflict with an instruction in load/store execution unit 210a for the same processor clock cycle. If so, conflict resolution unit 212 allows one of the instructions to execute while delaying execution of the other instruction until the next clock cycle. The instructions for both load/store execution units 210 are stored in program order in load/store buffers 214. Every write to a load/store buffer 214 will be done to both load/store buffers 214 at the same time so that the contents of load/store buffers 214 are identical. With identical load/store buffers 214, each load/store execution unit 210 can independently check for address dependency.

Load/store execution units 210 have one port to send one instruction from pipeline 218a and one instruction from pipeline 218b to data cache 216a for a total of two load/store instructions per clock cycle in single thread mode.

When switching to single-thread mode, data cache 216b will be initialized as victim cache for data cache 216a. When switching from single-thread mode to multi-thread mode, data cache 216b will be reconfigured as L1 data cache for pipeline 218b.

An instruction unit (not shown) implements instruction queues that provide one program instruction to each of respective decode units 202 during each processor clock cycle. In single thread mode, processor 102 can concurrently send one instruction to each of decode units 202a, 202b, and 202c resulting in execution of three instructions per cycle.

Decode units 202 can include logic to multiplex valid instructions, decode instructions for instruction type, source, and destination operands, generate queue entries and tags for instructions, determine source and destination register dependencies between decoded instructions, check dependency with previous instructions in execution queues 204, and separate complex instructions into micro-instructions. Decode units 202 can also handle issuing serialize instructions such as instruction exceptions (e.g., Translation Look-aside Buffer miss, breakpoint, and illegal instruction), software interrupts (SWI), and instructions that modify processor configuration and states.

Decode units 202a, 202b, 202c issue instructions to load/store execution queues 204a, 204b in single thread mode. In multi-thread mode, decode units 202a, 202b are restricted to issue instructions to load/store execution queue 204a and decode units 202c, 202d are restricted to load/store execution queue 204b. Decode units 202 can also update renaming in register files 208 for issued instructions. Queues 204 are designed to have optimal size for normal execution.

Microprocessors that require instructions to be executed in-order experience long delays when data required to execute the instruction is not found in cache memory, i.e., a cache miss occurs. Further, instructions that depend on one another may fill the execution queue and block the execution of independent instructions. Microprocessors that allow out-of-order execution include a replay queue for instructions that experience a data cache miss and constantly check for availability of source operands in order to execute instructions. In contrast, processor 102 can further schedule execution of instructions using load arbiter 206 to arbitrate execution of load/store instructions in load queues 204 both in-order and out-of-order. Each execution pipeline 218a, 218b of processor 102 includes multiple load queues 204 to hold the dependent instructions that experience a cache miss in the same queue until completion instead of replaying or re-issuing instructions while independent instructions are free to issue from other execution queues. Additionally, when an instruction issues, since the instructions in queues 204 can be in-order, data for source operands will be available from result forwarding or from register file 208a. In many cases, it is possible to statistically determine when data for the source operands of an instruction will be available and schedule accordingly. However, in some cases, such as Level-1 data cache misses, the data may not be available as expected. In cases where instructions are dependent on two load instructions, the dependent instructions can be sent to two different queues 204. The dependent instruction in one of queues 204 will then be invalidated when the copy of the instruction reaches the head of another of queues 204.

Load arbiters 206 send instructions to load/store execution units 210. Load instructions from load queues 204 dispatch to load/store execution units 210 and will remain in a respective queue 204 until data is returned in the next clock cycle, effectively blocking all dependent instructions until valid data is returned in the next clock cycle. Load/store execution units 210 can send data ready signals to load queues 204 when a cache hit is detected from data cache 216a. The bottom entries of load/store execution queues 204 can send an entry or tag that includes time stamp information to load arbiter 206. The time stamp information allows load arbiter 206 to determine and send the oldest instruction to load/store execution units 210. Alternatively, load/store arbiter 206 can receive and send instructions on a round robin basis, where the first instruction that reaches arbiter 206 is the first instruction sent to load/store execution units 210. The round robin basis is matched by decode units 202 for issuing independent load/store instructions to load/store execution queue 204.

Data cache 216a returns a hit/miss indication to load/store execution unit 210a. In addition, if the particular memory operation is a load and results in a cache hit, data cache 216a forwards the corresponding load data to load/store execution unit 210a or 210b. When operating in single thread mode, data cache 216a uses two ports and may thus receive up to two concurrent requests from load/store execution units 210a, 210b.

Figure 2B:
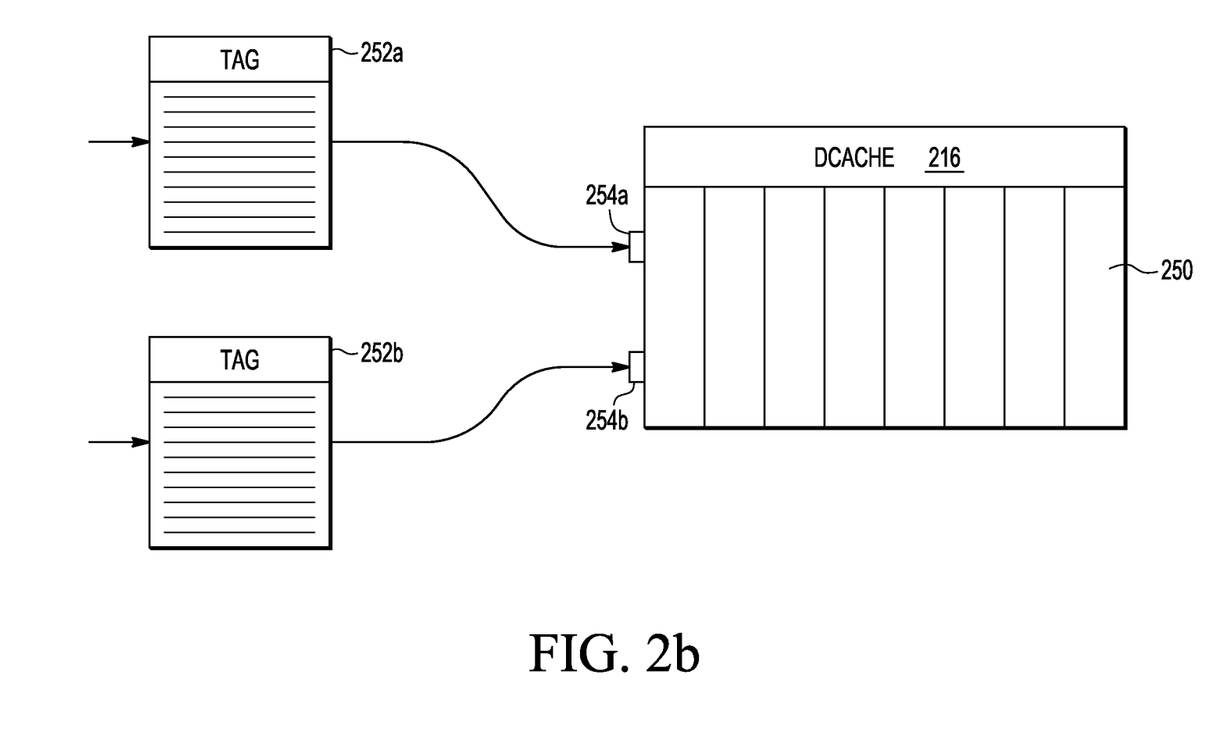
FIG. 2B is a diagram of an embodiment of L1 data cache of FIG. 2A configured for single thread mode.

As shown in FIG. 2B, data cache 216a may employ a banked configuration in single thread mode in which cache lines are stored across at least two banks 250 and two requests may be serviced concurrently as long as they access different banks. The number of banks is large enough to avoid bank conflicts when being accessed via two ports 254a, 254b. For example, data cache 216a can be configured with eight banks 250, with each bank 250 including 64 bits. In single thread mode, cache 216a can also be configured with two tag arrays 252a, 252b, with tag array 252a being accessed for addresses from load/store execution unit 210a, and tag array 252b being accessed for addresses from load/store execution unit 210b. Data cache 216a is configured to allocate cache lines in response to requests that miss, and communicates with victim cache 216b or Level 2 data cache (not shown) to fetch the missing cache line(s).

Tag arrays 252a, 252b are used to determine which memory locations are actually stored in cache 216a. In general, tag arrays 252 include a plurality of entries corresponding to the entries of data cache 216a. Each entry is indexed by some number of bits of the address generated by processor core 110 (FIG. 1), with the tag entry itself containing the most significant bits of the memory location which is stored in the corresponding data cache entry.

Figure 3:
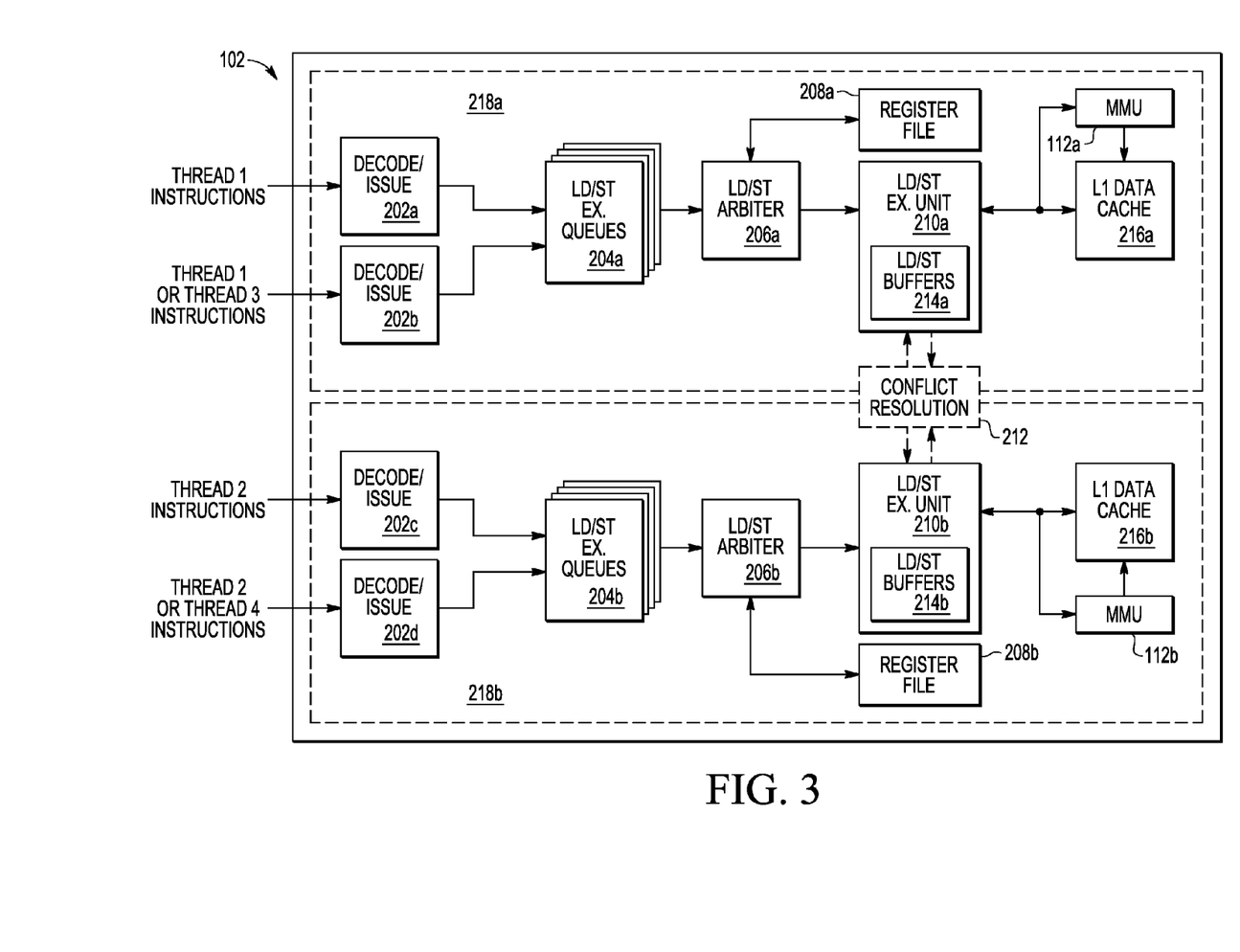
FIG. 3 is a diagram of an embodiment of components that are utilized in the computer processor of FIG. 1 running in multi-thread mode.

FIG. 3 is a diagram of an embodiment of components in computer processor 102 of FIG. 1 that can be used in dual or quad thread modes wherein cache 216b is configured as a level 1 data cache for pipeline 218b instead of a victim cache for data cache 216a (as shown in FIG. 2A). In some embodiments, components can be divided equally between the first and second sets of threads. For example, a first set of one or more threads can use decode units 202a, 202b, execution queues 204a, arbiter 206a, register file 208a, load/store execution unit 210a, a branch execution unit (not shown), MMU 112a, and data cache 216a. A second set of one or more threads can use decode units 202c, 202d, execution queues 204b, arbiter 206b, register file 208b, load/store execution unit 210b, a branch execution unit (not shown), MMU 112b, and data cache 216b. Other components (not shown) such as a floating point unit, an integer complex execution unit, and/or one or more integer execution units, for example, can be shared between the two pipelines 218.

One multi-threading technique that can be used in dual-thread mode is symmetrical multi-threading, while quad-thread mode can use simultaneous threading (SMT) wherein instructions from more than one thread can be executed in any given pipeline stage at a time for four threads.

Figure 4:
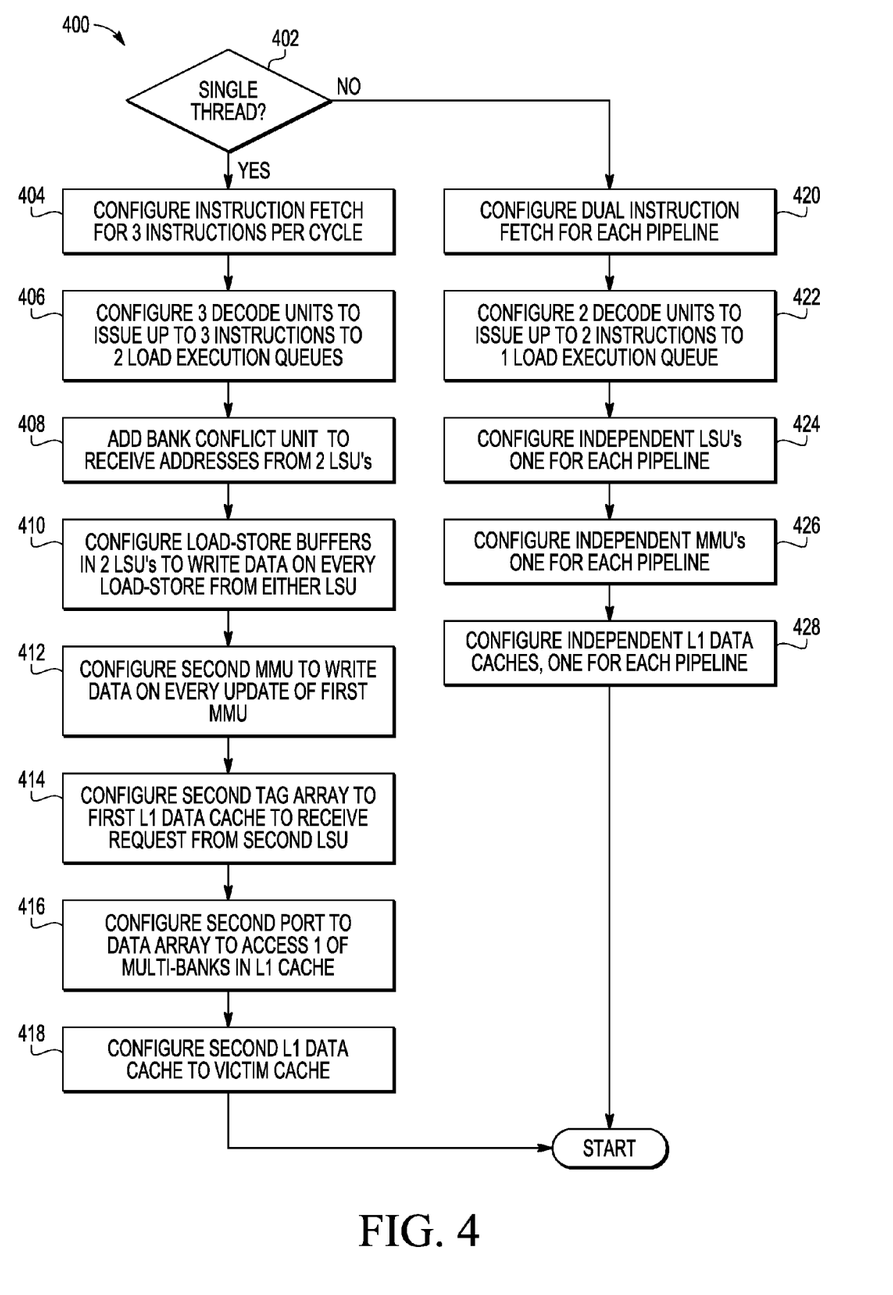
FIG. 4 is a flow diagram of an embodiment of a method for reconfiguring load/store execution units when a multi-threading processor is operating in single thread mode.

Referring to FIGS. 2A, 3, and 4, FIG. 4 shows a flow diagram of an embodiment of a method 400 for configuring load/store execution units 210 in a computer processor between single and multi-threaded operating modes. Process 402 determines whether a single thread is being executed. If so, process 404 configures instruction fetch units for three instructions per cycle. Process 406 includes setting up three decode/issue units 202a, 202b, 202c to issue up to three instructions to two respective load/store execution queues 204.

Process 408 includes adding a bank conflict resolution unit 212 to receive addresses from two load/store units 210.

Process 410 includes configuring load/store buffers 214 in load/store execution units 210 to write data on every load/store instruction from either load/store execution unit 210 so that the contents of load/store buffers 214 are identical to one another each clock cycle.

Process 412 includes configuring second MMU 112b to update data in MMU 112b on every update of data in first MMU 112a so that the data in MMUs 112 are identical.

Process 414 includes adding a second tag array 252b to access data cache 216a from second load/store execution unit 210b. Second tag array 252b is updated on every update of data in first tag array 252a so that the data in tag arrays 252 are identical.

Process 416 includes adding a second port to L1 data cache 216a to access one of multiple banks 250 of data in L1 data cache 216a.

Process 418 includes configuring second L1 data cache 216b as a victim cache for the first L1 data cache 216a, thereby effectively doubling the size of L1 data cache available for the instructions from load/store units 210.

Returning to process 402, if processor 102 is not operating in single thread mode, process 420 includes configuring two instruction fetch units (not shown in FIG. 3) for each pipeline 218.

Process 422 includes configuring two decode/issue units 202a/202b, 202c/202d per pipeline. Each set of decode/issue units 202a/202b, 202c/202d issue up to two instruction to a corresponding load/store queue 204a, 204b and load/store execution unit 210a, 210b.

Process 424 includes configuring independent load/store execution units 210a, 210b for each pipeline 218a, 218b.

Process 426 includes configuring independent MMUs 112a, 112b for each pipeline 218a, 218b.

Process 428 includes configuring independent L1 data caches 216a, 216b for each pipeline 218a, 218b.

Figure 5:
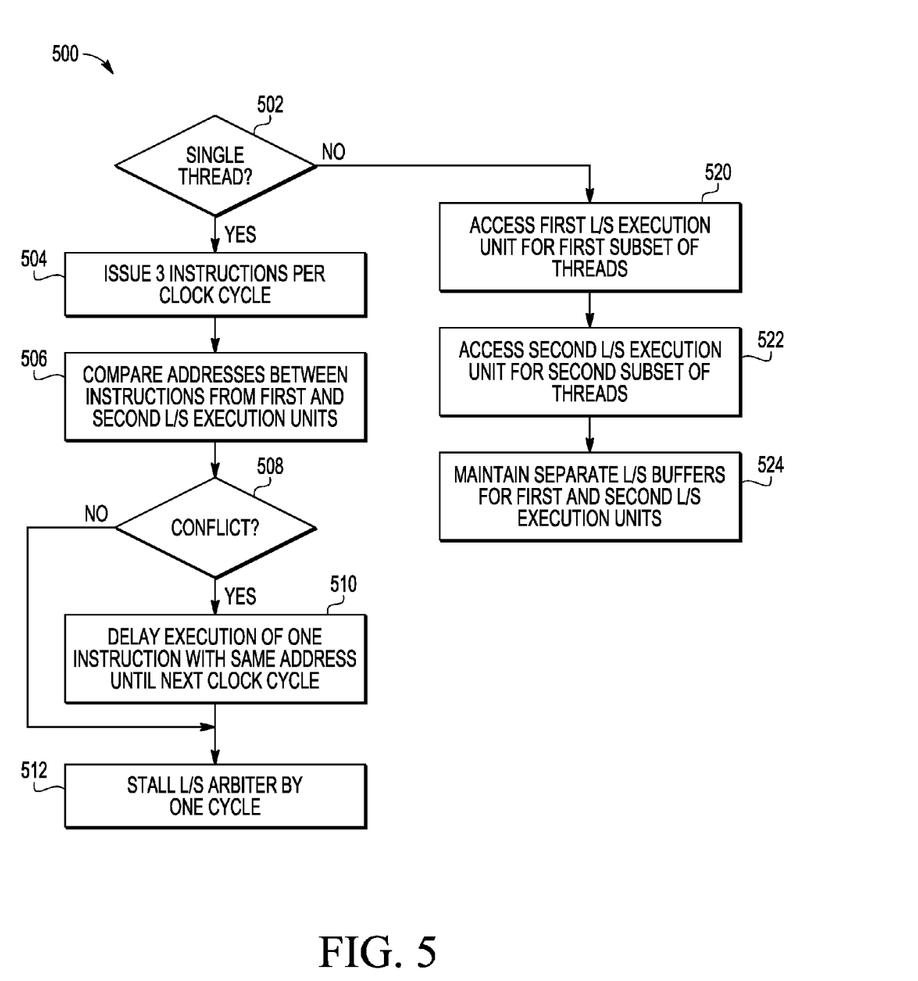
FIG. 5 is a flow diagram of an embodiment of a method for accessing load/store execution units for single and multi-threading modes.

Referring to FIGS. 2A and 5, FIG. 5 shows a flow diagram of an embodiment of a method 500 for accessing load/store execution units 210 in a computer processor between single and multi-threaded operating modes. Process 502 determines whether a single thread is being executed. If so, process 504 issues up to three instructions per clock cycle, to respective decode units 202a, 202b, 202c. A fourth instruction can also be issued to decode unit 202d.

First and second load/store execution units 210 execute at least two load/store instructions per cycle for the single program thread. Process 506 can be implemented in conflict resolution module 212 to detect address conflicts between instructions from first load/store execution unit 210a and instructions from second load/store execution unit 210b. When two instructions are issued in single thread mode, process 506 compares a portion of addresses from the two instructions per processor clock cycle.

Process 508 determines whether there is an address conflict. An address conflict arises when the load/store requests access the same bank in L1 data cache 250 (FIG. 2B). When an address conflict is detected, process 510 delays execution of one of the instructions with the address conflict until the next clock cycle. The amount of delay is typically one clock cycle, but other suitable delays can be used.

Process 512 can include updating load/store arbiters 206 based on the whether an address conflict was detected and an instruction with the address conflict is delayed from entering the pipeline.

Returning to process 502, if processor 102 is not operating in single thread mode, process 520 includes accessing first load/store queues 204a and first load/store execution unit 210a for a first thread. Process 522 includes accessing second load/store queues 204b and second load/store execution unit 210b for a second thread.

Process 524 includes maintaining the contents of first load/store buffers 214a accessed by first load/store execution unit 210a. The contents of second load/store buffers 214b accessed by second load/store execution unit 210b are maintained independently of load/store buffers 214a. Similarly, tag arrays 252 and MMUs 112 are maintained independently of one another.

By now it should be appreciated that embodiments of the disclosure provide multiple levels of multi-threading. The first level is single thread which uses components from first and second instruction pipelines 218a, 218b to provide increased instructions per cycle performance in single thread mode. The second level of multi-threading is dual-thread mode in which a minimum amount of components in processor 102 are shared, such as simple and complex integer execution units, and floating point unit. The third level of multi-threading is quad-thread mode in which processor 102 is configured to the equivalent of two cores, with each core handling two threads. Some of the components in processor 102 are reconfigured between multi-thread to single thread modes including load/store execution units 210. In multi-thread mode, load/store execution units 210 are independent with dedicated load execution queues 204, load/store buffer 214, dTLB, and data cache—tag array, data array, fill buffer.

In single thread mode load/store execution units 210 are effectively merged into one load/store execution unit by communicating instructions entering load/store execution unit 210b to load/store execution unit 210a, maintaining identical load/store buffers 214 in each load/store execution unit 210, maintaining two banks of data in data cache 216a, and accessing data cache 216a via two ports in load/store execution unit 210a.

Some of the above embodiments, as applicable, may be implemented using a variety of different information processing systems. For example, although FIG. 1 and the discussion thereof describe an exemplary information processing architecture, this exemplary architecture is presented merely to provide a useful reference in discussing various aspects of the disclosure. Of course, the description of the architecture has been simplified for purposes of discussion, and it is just one of many different types of appropriate architectures that may be used in accordance with the disclosure. Those skilled in the art will recognize that the boundaries between logic blocks are merely illustrative and that alternative embodiments may merge logic blocks or circuit elements or impose an alternate decomposition of functionality upon various logic blocks or circuit elements.

Thus, it is to be understood that the architectures depicted herein are merely exemplary, and that in fact many other architectures can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the functionality of the above described operations merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

In one embodiment, system 100 is a computer system such as a personal computer system. Other embodiments may include different types of computer systems. Computer systems are information handling systems which can be designed to give independent computing power to one or more users. Computer systems may be found in many forms including but not limited to mainframes, minicomputers, servers, workstations, personal computers, notepads, personal digital assistants, electronic games, automotive and other embedded systems, cell phones and various other wireless devices. A typical computer system includes at least one processing unit, associated memory and a number of input/output (I/O) devices.

Although the disclosure is described herein with reference to specific embodiments, various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure. Any benefits, advantages, or solutions to problems that are described herein with regard to specific embodiments are not intended to be construed as a critical, required, or essential feature or element of any or all the claims.

The term "coupled," as used herein, is not intended to be limited to a direct coupling or a mechanical coupling.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to disclosures containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

What is claimed is:

1. A method comprising:
   in a computer system executing multiple program threads in a processing unit:
      configuring a first load/store execution unit to handle instructions from a first program thread;
      configuring a second load/store execution unit to handle instructions from a second program thread;
   in the computer system executing a single program thread in the processing unit:
      configuring the first and second load/store execution units to handle instructions from the single program thread;
      configuring a Level 1 (L1) data cache with a first port to communicate with the first load/store execution unit and a second port to communicate with the second load/store execution unit;
      adding a second tag array for the first L1 data cache, wherein the first load/store execution unit uses a first tag array to access the first L1 data cache and the second load/store execution unit uses the second tag array to access the first L1 data cache;
      for every load/store instruction from the first and second load/store execution units, maintaining duplicate data and address information in a first load/store buffer associated with the first load/store execution unit and in a second load/store buffer associated with the second load/store execution unit.

2. The method of claim 1 further comprising:
   in single thread mode, detecting address conflicts between instructions from the first load/store execution unit and instructions from the second load/store execution unit.

3. The method of claim 2 further comprising:
   in single thread mode, when an address conflict arises during a same processor clock cycle, delaying execution of one of the instructions.

4. The method of claim 1 further comprising:
   in single thread mode, configuring two decode/issue units to issue two instructions to a first load/store execution queue and one decode/issue unit to one instruction to a second load/store execution queue.

5. The method of claim 1 further comprising:
   in single thread mode,
      configuring the first load/store execution unit with a first load/store buffer;
      configuring the second load/store execution unit with a second load/store buffer; and writing data into the first and second load/store buffers for every load/store instruction from the first and second load/store execution units.

6. The method of claim 1 further comprising:
in single thread mode,
writing any data updates to a memory management unit (MMU) to both a first MMU and a second MMU.

7. The method of claim 1 further comprising:
in single thread mode,
reconfiguring a second L1 data cache as a victim cache for the first L1 data cache.

8. A microprocessor system comprising:
a first L1 data cache;
a second L1 data cache;
a first load/store execution unit;
a second load/store execution unit;
a first load/store buffer coupled to the first load/store execution unit;
a second load/store buffer coupled to the second load/store execution unit;
a conflict resolution unit;
a first MMU associated with the first L1 data cache;
a second MMU associated with the second L1 data cache;
when the system is configured for a multi-thread mode,
a first program thread accesses the first load/store execution unit;
a second program thread accesses the second load/store execution unit;
the first load/store execution unit accesses the first L1 data cache;
the second load/store execution unit accesses the second L1 data cache; and
when the system is configured for a single-thread mode,
a single program thread accesses the first and second load/store execution units, and the first and second load/store units access the first L1 data cache;
the conflict resolution unit delays execution of an instruction from the second load/store execution unit when an address conflict with an instruction from the first load/store execution unit is detected;
any first and second L1 data cache updates are written to both the first MMU and the second MMU; and
load/store data is written into the first and second load/store buffers for every load/store instruction from the first and second load/store instruction units.

9. The system of claim 8 further comprising:
when the system is configured for the single thread mode,
a first tag array for the first L1 data cache;
a second tag array for the first L1 data cache, wherein the first load/store execution unit uses the first tag array to access the first L1 data cache and the second load/store execution unit uses the second tag array to access the first L1 data cache.

10. The system of claim 8 further comprising:
when the system is configured for a single-thread mode,
a second L1 data cache is configured as a victim cache for the first L1 data cache.

11. A processing system comprising:
a first load/store execution unit including first load/store buffers;
a second load/store execution unit including second load/store buffers;
a first data cache;
logic instructions executable to:
determine a number of program threads executing in the processing system; and
when a single program thread is executing,
maintain identical load/store buffers for the first and second load/store execution units,
access a first bank in the first data cache via a first port for instructions from the first load/store execution unit, and
access a second bank in the first data cache via a second port for instructions from the second load/store execution unit.

12. The system of claim 11 further comprising:
a conflict resolution unit; and
when the system is configured for the single thread mode,
the conflict resolution unit delays execution of an instruction from the second load/store execution unit when an address conflict is detected.

13. The system of claim 11 further comprising:
when the system is configured for the single thread mode,
any data updates to a memory management unit (MMU) are written to both a first MMU and a second MMU.

14. The system of claim 13 further comprising:
a first MMU coupled to the first L1 data cache;
a second MMU coupled to the first L1 data cache;
when the system is configured for the single thread mode,
data is written into the first and second MMUs for every load/store instruction from the first and second load/store execution units.

15. The system of claim 14 further comprising:
when the system is configured for the single thread mode,
a first tag array for the first L1 data cache;
a second tag array for the first L1 data cache, wherein the first load/store execution unit uses the first tag array to access the first L1 data cache and the second load/store execution unit uses the second tag array to access the first L1 data cache.

16. The system of claim 11 further comprising:
when the system is configured for a single-thread mode,
a second L1 data cache is configured as a victim cache for the first L1 data cache.

* * * * *